United States Patent
Yamada et al.

(10) Patent No.: US 7,078,645 B2
(45) Date of Patent: Jul. 18, 2006

(54) WORKING LIQUID EJECTOR OF WIRE ELECTRIC DISCHARGE MACHINE

(75) Inventors: Hisashi Yamada, Tokyo (JP); Ryogo Koba, Tokyo (JP); Takuji Magara, Tokyo (JP); Masao Akiyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/499,946

(22) PCT Filed: Mar. 28, 2002

(86) PCT No.: PCT/JP02/03087

§ 371 (c)(1),
(2), (4) Date: Oct. 27, 2004

(87) PCT Pub. No.: WO03/082505

PCT Pub. Date: Oct. 9, 2003

(65) Prior Publication Data

US 2005/0072759 A1     Apr. 7, 2005

(51) Int. Cl.
*B23H 7/10*     (2006.01)
(52) U.S. Cl. .................. 219/69.12; 219/69.14
(58) Field of Classification Search ............. 219/69.12, 219/69.14
See application file for complete search history.

(56) References Cited

U.S. PATENT DOCUMENTS

| 4,495,393 | A | * | 1/1985 | Janicke | ..................... 219/69.12 |
| 5,128,505 | A | * | 7/1992 | Matter | ..................... 219/69.12 |

FOREIGN PATENT DOCUMENTS

| JP | 54-135795 | U | | 9/1979 |
| JP | 59-140134 | U | | 9/1984 |
| JP | 60-029227 | A | | 2/1985 |
| JP | 60029227 | A | | 2/1985 |
| JP | 60-127925 | A | | 7/1985 |
| JP | 60127925 | A | | 7/1985 |
| JP | 1-164521 | A | * | 6/1989 |
| JP | 01-164521 | A | | 6/1989 |
| JP | 01164521 | A | | 6/1989 |
| JP | 02-291127 | A | | 12/1990 |
| JP | 02291127 | A | | 12/1990 |
| JP | 03-089886 | A | | 4/1991 |
| JP | 03089886 | A | | 4/1991 |
| JP | 10-43947 | A | * | 2/1998 |

* cited by examiner

*Primary Examiner*—Geoffrey S. Evans
(74) *Attorney, Agent, or Firm*—Sughrue Mion, PLLC

(57) ABSTRACT

A machining-fluid ejection device for a wire electric discharge machining apparatus includes a nozzle for ejecting machining-fluid into an inter-electrode gap between a workpiece (W) and a wire electrode (E), a casing (16) fixed to a machining head (15) disposed above or below the workpiece (W), a coupling member (18) for coupling the casing (16) and a nozzle (17), having a predetermined elastic coefficient, and deforming according to the machining-fluid pressure; an assemblage of the coupling member (18) and the nozzle (17) has hollow portions, formed with an inlet side internal diameter (D2) and an outlet side internal diameter (D1) on a machining-fluid inlet side and outlet side respectively, whose sectional areas do not change, and a hollow portion, formed with a minimum internal diameter (D0) between the machining-fluid inlet side and the outlet side, whose sectional area does not change. Machining productivity may be raised for nozzle contact machining and nozzle separation machining.

13 Claims, 10 Drawing Sheets

WORKING LIQUID EJECTOR OF WIRE ELECTRIC DISCHARGE MACHINE

TECHNICAL FIELD

The present invention relates to improvement in machining-fluid ejection devices, for wire electric discharge machines, that eject the machining-fluid into an inter-electrode gap between a wire electrode and a workpiece.

BACKGROUND ART

In wire electric discharge machining, insulating machining-fluid is introduced between a wire electrode and a workpiece as electrodes, and while the wire electrode and the workpiece are moved relative to one another, machining electric power is supplied to the inter-electrode gap, and the workpiece is machined by electric discharge energy.

In this type of wire electric discharge machine that performs wire electric discharge machining, the wire electrode is fed from a supply reel at a fixed speed, is positioned above or below the workpiece, and is supplied between machining heads provided with a wire guide. Further, the machining-fluid is ejected from a nozzle disposed above or below the workpiece, whereby removal of machining waste from the inter-electrode gap, cooling, etc., are performed. To increase machining speed, it is necessary to efficiently eject the machining-fluid at high pressure into the inter-electrode gap.

For this type of goal, in machining-fluid ejection devices in conventional wire electric discharge machines, a method is generally adopted whereby the internal diameter of the nozzle that ejects the machining-fluid (hereinafter referred to as the "nozzle diameter") and the ejection pressure of the machining-fluid are optimized.

Furthermore, in order to efficiently eject the machining-fluid into the inter-electrode gap and to suppress the influence of the pressing force of the nozzle on the workpiece, fine adjustment is necessary to have the nozzle and the workpiece as close as possible, or, where the nozzle and the workpiece are in contact (hereinafter referred to as "nozzle contact machining"), to make the pressing force of the nozzle small.

These types of problems are addressed by machining-fluid ejection devices for wire electric discharge machine apparatuses disclosed, for example, by Japanese Patent Laid-Open No. 1990-292127 (Japanese Patent No. 2656129, U.S. Pat. No. 5,128,505).

FIG. 9 is a sectional diagram illustrating a configuration for the machining-fluid ejection device in the conventional wire electric discharge machine apparatus disclosed in the above publications. In the figure, reference numeral 1 is a casing that is fixed to a machining head of the electric discharge machine, reference numeral 2 is a movable element that can slide relative to the casing 1, reference numeral 3 is a nozzle that can slide relative to the movable element 2, reference numeral 4 is a nozzle through which a wire runs, reference numeral 5 is a wire guide, reference numeral 6 is a channel, reference numeral 7 is an ejection chamber, reference numeral 8 is a pressure chamber, reference numeral 9 is a second chamber, reference numerals 10 and 11 are orifices, reference W is a workpiece. Machining-fluid from the channel 6 is supplied as a pressurized fluid flow, and the machining-fluid is ejected from the nozzle 3 towards the inter-electrode gap between the wire electrode, which is not illustrated in the figure, and the workpiece W. The pressurized chamber 8 and the second chamber 9 are configured so that the pressure of the pressurized chamber 8 and the pressure of the ejection chamber 7 act on the nozzle 3 in opposite directions, and even when the machining-fluid is ejected at high pressure into the inter-electrode gap, the influence of the reaction force on the machining head is sufficiently eased, and this arrangement enables high-accuracy, high-speed machining to be performed.

In this type of configuration for the machining-fluid ejection devices in the wire electric discharge machines, the position of the machining-fluid emitting nozzle 3 can be automatically fine-tuned relative to the workpiece W, and contact machining can be performed; however, there have been problems in that the pressurized chamber 8 and the like have to be provided, and the structure becomes complicated.

FIG. 10 is an explanatory diagram illustrating an example of machining where a distance is required between the nozzle and the workpiece (hereinafter referred to as "nozzle separation machining"). In the figure, reference numerals 12a and 12b are machining heads, reference numerals 13a and 13b are machining-fluid ejection devices, reference numeral 14 is a clamp jig for fixing the workpiece W, reference E is a wire electrode. FIG. 10(a) illustrates a case where it is necessary to perform nozzle separation machining because the clamp jig 14 that fixes the workpiece W may interfere with the upper machining-fluid ejection device member 13a, and FIG. 10(b) illustrates a case where it is necessary to perform nozzle separation machining for counter boring or rear-side residue clearing in the workpiece.

In cases where nozzle separation machining is performed, as in FIG. 10, in order to efficiently eject the machining-fluid at high pressure into the inter-electrode gap between the wire electrode and the workpiece and thus raise machining productivity, it is necessary to configure the nozzle diameter differently to the nozzle diameter when performing contact machining.

In the machining-fluid ejection device of the conventional wire electric discharge machining apparatus as in FIG. 9, in cases where the nozzle diameter is configured to be suitable for nozzle contact machining, since the nozzle diameter cannot be configured to be suitable for nozzle separation machining, there have been problems in that the machining speed decreases when performing the nozzle separation machining, and the productivity of the overall machining diminishes.

DISCLOSURE OF INVENTION

The present invention is directed at solving these types of problems and has as an object the realization of a machining-fluid ejection device for a wire electric discharge machining apparatus that can raise machining productivity for nozzle contact machining and also for nozzle separation machining.

The machining-fluid ejection device for the wire electric discharge machining apparatus related to the present invention comprises: a nozzle, fixed to a machining head disposed above or below a workpiece, for ejecting machining-fluid into an inter-electrode gap between the workpiece and a wire electrode; a casing fixed to the machining head; and a coupling member, having a predetermined elastic coefficient, for coupling the casing and the nozzle, and deforming according to the machining-fluid pressure; wherein an assemblage of the coupling member and the nozzle has a hollow portion of a predetermined internal diameter (internal diameter of outlet side), whose sectional area does not change, formed on the machining-fluid outlet side, and a hollow portion of a predetermined internal diameter (minimum internal diameter smaller than the internal diameter of the outlet side), whose sectional area does not change, formed upstream of the machining-fluid outlet side.

In another aspect, the machining-fluid ejection device for the wire electric discharge machining apparatus related to the present invention comprises: a nozzle, fixed to a machining head disposed above or below a workpiece, for ejecting machining-fluid into an inter-electrode gap between the workpiece and a wire electrode; a casing fixed to the machining head; a coupling member supported so that it can slide, relative to the casing, in the direction of machining-fluid ejection, the coupling member linking the casing and the nozzle; and an elastic body, having a predetermined elastic coefficient, deforming according to the machining-fluid pressure, a righting force due to this deformation acting on the coupling member in a direction opposite to the direction of the machining-fluid ejection; wherein an assemblage of the coupling member and the nozzle has a hollow portion of a predetermined internal diameter (internal diameter of outlet side), whose sectional area does not change, formed on the machining-fluid outlet side, and a hollow portion of a predetermined internal diameter (minimum internal diameter smaller than the internal diameter of the outlet side), whose sectional area does not change, formed upstream of the machining-fluid outlet side.

In another aspect, the machining-fluid ejection device for the wire electric discharge machining apparatus related to the present invention comprises: a nozzle, fixed to a machining head disposed above or below a workpiece, for ejecting machining-fluid into an inter-electrode gap between the workpiece and a wire electrode; a casing fixed to the machining head; a nozzle supported so that it can slide, relative to the casing, in the direction of machining-fluid ejection; and an elastic body, having a predetermined elastic coefficient, deforming according to the machining-fluid pressure, a righting force due to this deformation acting on the nozzle in a direction opposite to the direction of the machining-fluid ejection; wherein the nozzle has a hollow portion of a predetermined internal diameter (internal diameter of outlet side), whose sectional area does not change, formed on the machining-fluid outlet side, and a hollow portion of a predetermined internal diameter (minimum internal diameter smaller than the internal diameter of the outlet side), whose sectional area does not change, formed upstream of the machining-fluid outlet side.

Furthermore, in the machining-fluid ejection device for the wire electric discharge machining apparatus related to the present invention, the internal diameter of the outlet side is selected to optimize the efficiency of the machining-fluid ejection into the inter-electrode gap when machining a corner portion with the nozzle and the workpiece in close proximity or in contact, and the minimum internal diameter is selected to optimize the efficiency of the machining-fluid ejection into the inter-electrode gap when machining a corner portion with the nozzle and the workpiece separated.

Furthermore, in the machining-fluid ejection device for the wire electric discharge machining apparatus related to the present invention, the assemblage of the coupling member and the nozzle has a hollow portion of a predetermined internal diameter (an internal diameter on inlet side, larger than the minimum internal diameter), whose sectional area does not change, formed upstream of the minimum internal diameter hollow portion.

Furthermore, in the machining-fluid ejection device for the wire electric discharge machining apparatus related to the present invention, the internal diameter on the inlet side is selected so that the pressing force of the nozzle on the workpiece is approximately zero when machining with the nozzle and the workpiece in contact.

Since the machining-fluid ejection device for a wire electric discharge machining apparatus related to the present invention is configured as above, the external diameter of the ejected machining-fluid can be automatically switched for the nozzle contact machining or for the nozzle separation machining, and the effect of being able to raise the overall machining productivity is achieved.

Further, since the pressing force of the nozzle on the workpiece can be reduced when performing the nozzle contact machining, the effect of being able to improve the machining accuracy is realized.

BEST MODE FOR CARRYING OUT THE INVENTION

EMBODIMENT 1

Figure 1:
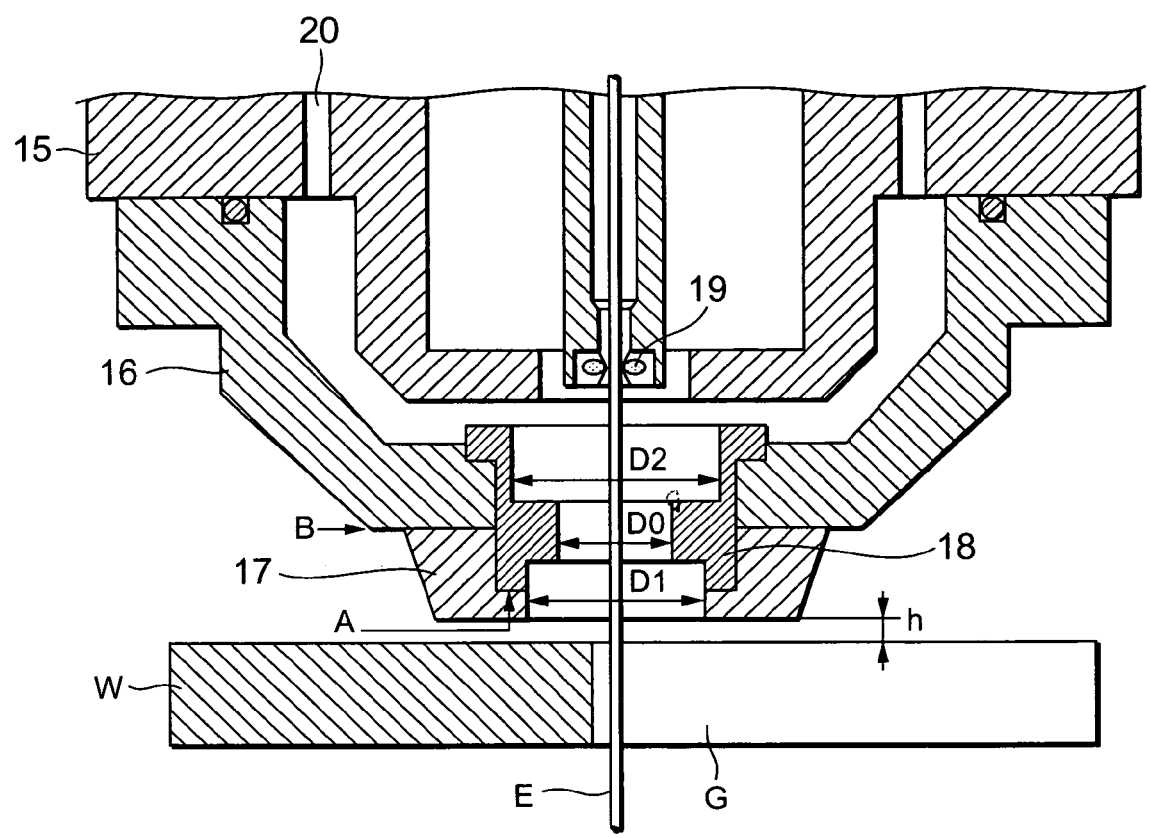
FIG. 1 is a sectional diagram illustrating a configuration of a machining-fluid ejection device for a wire electric discharge machining apparatus related to Embodiment 1 of the present invention.

FIG. 1 is a sectional diagram illustrating a configuration of a machining-fluid ejection device for a wire electric discharge machining apparatus related to Embodiment 1 of the present invention. In the figure, reference numeral 15 is a machining head, reference numeral 16 is a casing fixed to the machining head 15, reference numeral 17 is a nozzle, reference numeral 18 is a coupling member, reference numeral 19 is a wire guide, reference numeral 20 is machining-fluid supply duct for supplying machining-fluid as a pressurized fluid flow to inside the casing 16, reference E is a wire electrode, reference W is a workpiece, reference D1 is the internal diameter on a machining-fluid ejection outlet side of the coupling member 18 as well as the internal diameter of the nozzle 17, reference D2 is the internal diameter on a machining-fluid inlet side of the coupling member 18, reference D0 is a minimum internal diameter of the coupling member 18, h is the distance between opposing faces of the nozzle 17 and the workpiece W in cases where the machining-fluid is not supplied from the machining-fluid supply duct 20, and reference G is a machining groove.

The coupling member 18 is an elastic body made of material such as rubber or resin, for example, having a predetermined elastic coefficient, and is provided with hollow portions, having the internal diameters D2 and D1, on the machining-fluid inlet side and outlet side, and a hollow portion with the minimum internal diameter D0 between the machining-fluid inlet side and the outlet side, to form an orifice. Further, a machining-fluid outlet side extremity (A in the diagram) of the coupling member 18 is fixed to the nozzle 17, and the nozzle 17 and the coupling member 18 form an assemblage.

The casing 16 and the nozzle 17 are coupled via the coupling member 18, and the coupling member 18 is formed so that, in cases where the machining-fluid is not supplied from the machining-fluid supply duct 20, the opposing faces of the casing 16 and the nozzle 17 touch (B in the diagram).

The machining-fluid, supplied from the machining-fluid supply duct 20 and ejected, via the coupling member 18 and the nozzle 17 inside the casing 16, at the workpiece W, acts as an insulator, and by applying a pulse voltage between the workpiece W and the wire electrode E that is guided by the wire guide 19 and supplied in the direction of the workpiece W, and by generating an electric discharge, erosion machining of the workpiece is performed.

FIG. 2 is a sectional diagram for explaining operations of the machining-fluid ejection device for the wire electric discharge machining apparatus related to Embodiment 1 of the present invention, and references identical to those of FIG. 1 illustrate the same or equivalent parts. In FIG. 2, references P1 and P2 are machining-fluid pressures, reference F1 is an upward force due to the pressure P1 of the machining-fluid, F2 is a downward force due to the pressure P2 of the machining-fluid, F0 is a righting force caused by the elasticity of the coupling member 18, F is a pressing force of the nozzle 17 on the workpiece W, L is the natural length of the coupling member 18 in the machining-fluid ejection direction.

Figure 2A:
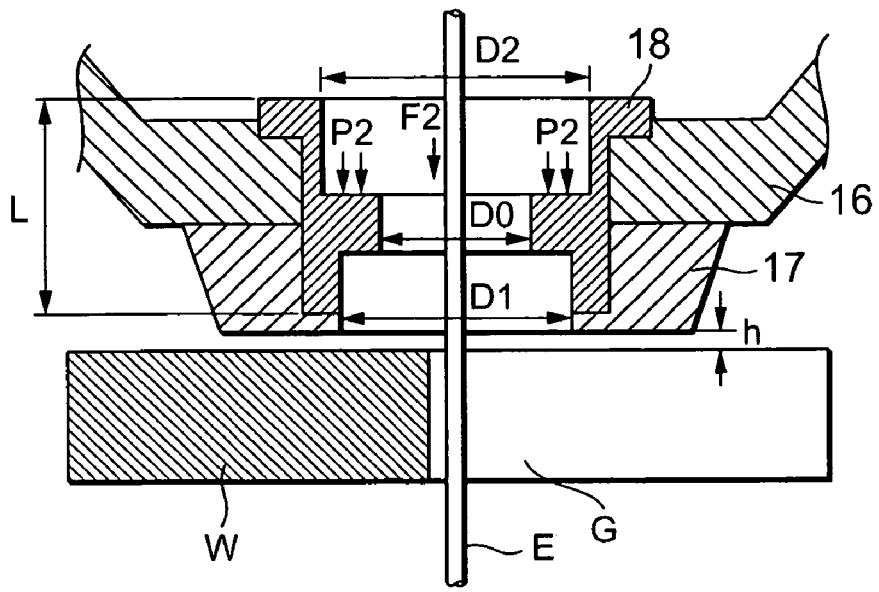
FIGS. 2a and 2b are sectional diagrams for explaining operations of the machining-fluid ejection device for a wire electric discharge machining apparatus related to Embodiment 1 of the present invention.
Figure 2B:
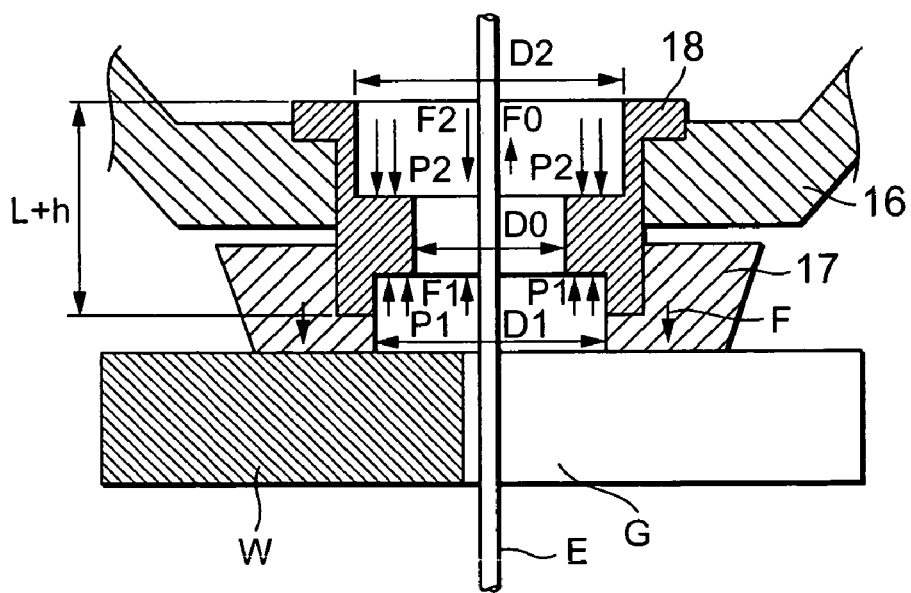

FIG. 2(a) illustrates non-machining or finished machining situations where the machining-fluid pressure is low, and FIG. 2(b) illustrates situations of rough machining where the machining-fluid pressure is high.

In FIG. 2, in the coupling member 18, the force F2 due to the machining-fluid pressure P2 acts in a downward direction. That is, the following equation holds:

$$F2=P2 \times \pi/4 \times (D2^2-D0^2) \quad (1)$$

In situations where the machining-fluid pressure is low, as in FIG. 2(a), since the downward force F2 is small, the coupling member 18 hardly deforms at all. That is, the distance h between opposing faces of the nozzle 17 and the workpiece W is maintained.

In situations where the machining-fluid pressure is high, as in FIG. 2(b), the free extension $\Delta L_{max}$ of the coupling member 18 due to the machining-fluid pressure is larger than the distance h between the opposing faces of the nozzle 17 and the workpiece A of FIG. 2(a). That is, the nozzle 17 is in contact with the face of the workpiece W and exerts pressure on the workpiece W.

In conditions as illustrated in FIG. 2(b), when the machining-fluid pressure is low, deformation of the coupling member 18 is small, and the nozzle 17 returns to the FIG. 2(a) position.

In FIG. 2(b), the upward force F1 due to the machining-fluid pressure P1 is given by the following equation:

$$F1=P1 \times \pi/4 \times (D1^2-D0^2) \quad (2)$$

In conditions as illustrated in FIG. 2(b), if the righting force due to the elasticity of the coupling member is F0, equation (3) and equation (4) are obtained:

$$h<\Delta L_{max} \quad (3)$$

$$F2>F1+F0 \quad (4)$$

In this case, the pressing force F of the nozzle 17 on the workpiece W is given by the following equation:

$$F=F2-F1-F0 \quad (5)$$

Moreover, if the pressure loss due to the machining-fluid that flows out from the machining groove G or from microscopic gaps between the nozzle 17 and the workpiece is $\Delta P$, the following equation is obtained:

$$P1=P2-\Delta P \quad (6)$$

This pressure loss $\Delta P$ can be obtained using well known experimental formulas, and it depends on details of the orifice formed by the coupling member 18. Therefore, by selecting the machining-fluid outlet side internal diameter D1, the machining-fluid inlet side internal diameter D2, and the minimum internal diameter D0 of the coupling member 18, with respect to the machining-fluid pressure P2, the pressing force F of the nozzle 17 on the workpiece W can be made to a desired value. That is, by the selection of the details of the orifice formed by the coupling member 18, it is possible to select the desired pressing force F, and thus high-efficiency, high-speed machining is possible with the nozzle 17 in contact with the face of the workpiece W.

Furthermore, when the pressing force F of the nozzle 17 on the workpiece W in equation (5) becomes zero, that is, when the following equation applies, frictional forces that occur when the nozzle 17 touches the workpiece W and relative movement occurs can be ignored, and thus even more highly accurate machining becomes possible.

$$F2=F1+F0 \quad (7)$$

Figure 3:
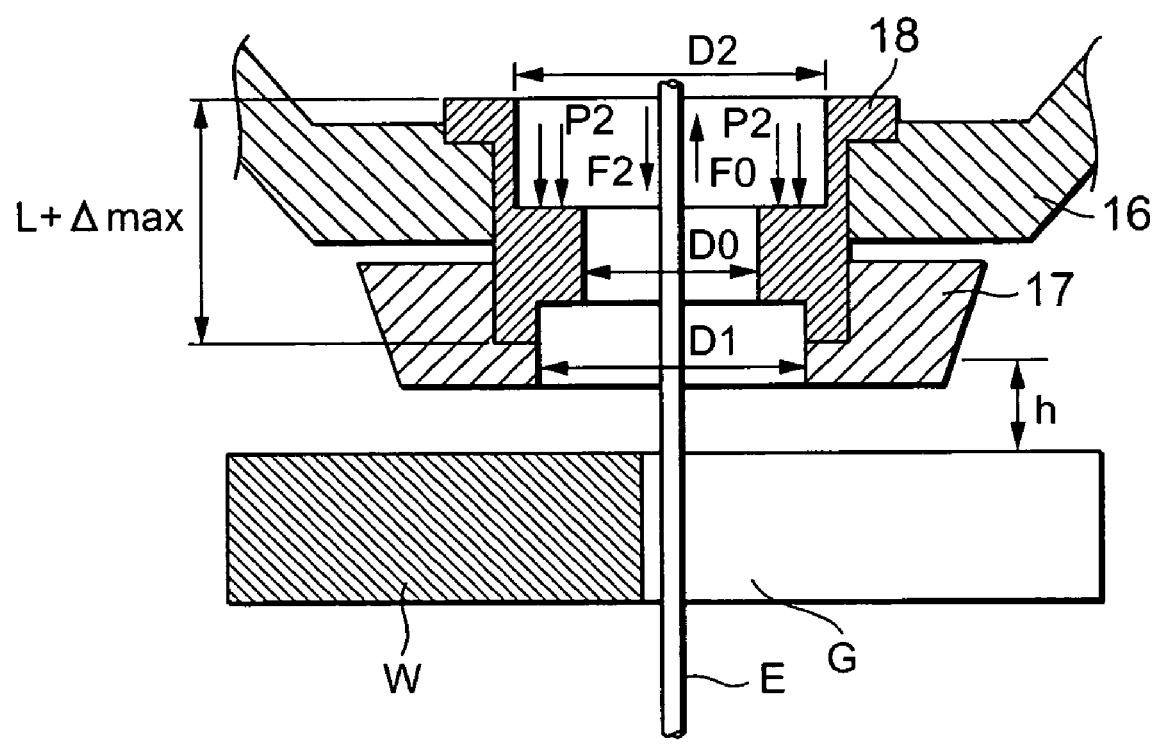
FIG. 3 is a sectional diagram for explaining operations of the machining-fluid ejection device for the wire electric discharge machining apparatus related to Embodiment 1 of the present invention.

FIG. 3 is a sectional diagram for explaining operations of the machining-fluid ejection device for the wire electric discharge machining apparatus related to Embodiment 1 of the present invention, and illustrates a case where the distance h between the opposing faces of the nozzle 17 and the workpiece W is large, when machining-fluid is not supplied from the machining-fluid supply duct 20. References identical to those of FIG. 2 illustrate the same or equivalent parts.

In FIG. 3, the following equation applies:

$$h>\Delta L_{max} \quad (8)$$

In this case, the machining-fluid pressure P1 does not act, the coupling member 18 deforms due to the downward force F2 due to the machining-fluid pressure P2, and the nozzle 17 stands still at a position where the downward force F2 due to the machining-fluid pressure P2 and the righting force F0 due to the elasticity of the coupling member 18 are balanced.

An optimal external diameter of the machining-fluid ejected by the nozzle 17, for nozzle contact machining or nozzle separation machining, will now be explained—that is, an example of the nozzle diameter which should be set.

With nozzle contact machining and nozzle separation machining, if straight-line machining and corner machining are compared, it is known that the influence of the nozzle diameter is small for straight-line machining, but the influence of the nozzle diameter for corner machining is large.

For example, with corner machining, where the nozzle 17 can be in contact with the workpiece W, as illustrated in FIG. 2(b) (equivalent to nozzle contact machining), if the external diameter of the ejected machining-fluid is approximately between 6 and 7 mm, the machining-fluid can be efficiently ejected into the inter-electrode gap. That is, in FIG. 2(b), since the effective internal diameter of the nozzle that ejects the machining-fluid is the same as the machining-fluid outlet side internal diameter D1 of the coupling member 18, D1 may be set to between 6 and 7 mm.

On the other hand, where the nozzle 17 cannot be in contact with the workpiece W, as illustrated in FIG. 3 (equivalent to nozzle separation machining), if the external diameter of the ejected machining-fluid is made below 4 mm, the machining-fluid jet sprayed out from the machining groove G can be reduced, and the machining-fluid can be efficiently ejected into the inter-electrode gap. That is, in FIG. 3, since the effective internal diameter of the nozzle that ejects the machining-fluid is the same as the minimum internal diameter D0 of the coupling member 18, D0 may be set to 4 mm or less.

In this way, by selecting the internal diameter D1 of the machining-fluid outlet side of the coupling member 18 to optimize the efficiency of the machining-fluid ejection into the inter-electrode gap when performing the nozzle contact machining of corner portions, and by selecting the minimum internal diameter D0 of the coupling member 18 to optimize the efficiency of the machining-fluid ejection to the inter-electrode, gap when performing the nozzle separation machining of corner portions, the external diameter of the ejected machining-fluid can be automatically switched for nozzle contact machining and for nozzle separation machining, and since the machining efficiency can be raised, productivity can be improved.

Figure 4:
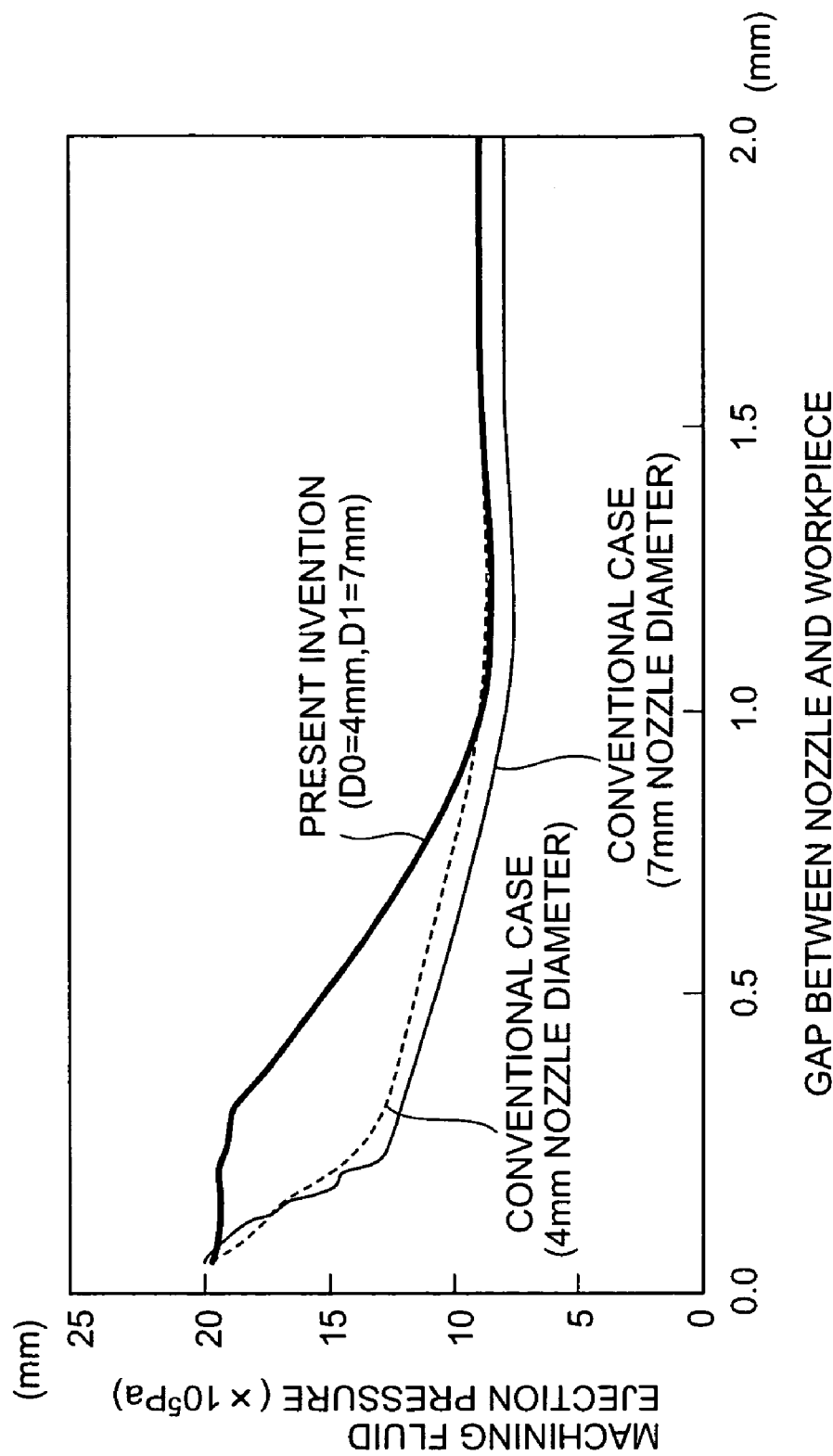
FIG. 4 is a diagram illustrating actually measured results of machining-fluid ejection pressure changes according to a gap between nozzle and workpiece.

FIG. 4 is a diagram illustrating actually measured results of machining-fluid ejection pressure changes according to the gap between the nozzle and the workpiece, and illustrates an example in which straight line machining is performed. FIG. 4 illustrates a configuration of the present invention (situations where D0=4 mm and D1=7 mm, in FIG. 1) together with a configuration of a conventional nozzle (situations where the nozzle diameter is 4 mm and where the nozzle diameter is 7 mm).

From FIG. 4, it may be understood that, when the gap between the nozzle and the workpiece becomes large, the machining-fluid ejection pressure in the configuration of the present invention and the machining-fluid ejection pressure in the configuration of the conventional nozzle of 4 mm diameter become approximately the same.

With the conventional nozzle configuration where the nozzle diameter is 4 mm and with the conventional nozzle configuration where the nozzle diameter is 7 mm, when the gap between the nozzle and the workpiece is in a range less than or equal to 0.3 mm, the machining-fluid ejection pressure drops abruptly. To address this, in the configuration of the present invention, the gap between the nozzle and the workpiece is automatically adjusted, and it may be understood that the machining-fluid ejection pressure drop can thus be restrained.

As described above, the minimum internal diameter D0 and the machining-fluid outlet side internal diameter D1 of the coupling member 18 are optimized, and furthermore, concerning the nozzle contact machining, from equations (6) and (7), with regard to the selected minimum internal diameter D0 and the machining-fluid outlet side internal diameter D1, if the machining-fluid inlet side internal diameter D2 is selected so that the pressing force F of the nozzle 17 on the workpiece W is approximately zero, frictional forces when the nozzle 17 touches the workpiece W can be ignored, and thus the productivity and the machining accuracy can be raised.

FIG. 5 is a diagram illustrating an alternative configuration example of the assemblage of the nozzle and the coupling member for the wire electric discharge machining apparatus related to Embodiment 1 of the present invention, and references identical to those of FIG. 1 illustrate the same or equivalent parts.

Figure 5A:
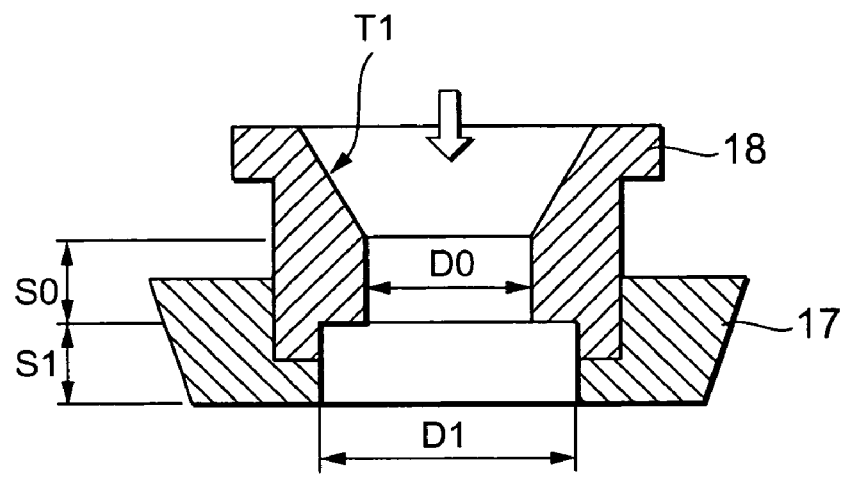
FIGS. 5a and 5b are diagrams illustrating an alternative configuration examples of an assemblage of the nozzle and a coupling member for the wire electric discharge machining apparatus related to Embodiment 1 of the present invention.

As in FIG. 5(a), in the assemblage of the nozzle 17 and the coupling member 18, the machining-fluid inlet side may have a tapered form (T1 in the diagram).

Figure 5B:
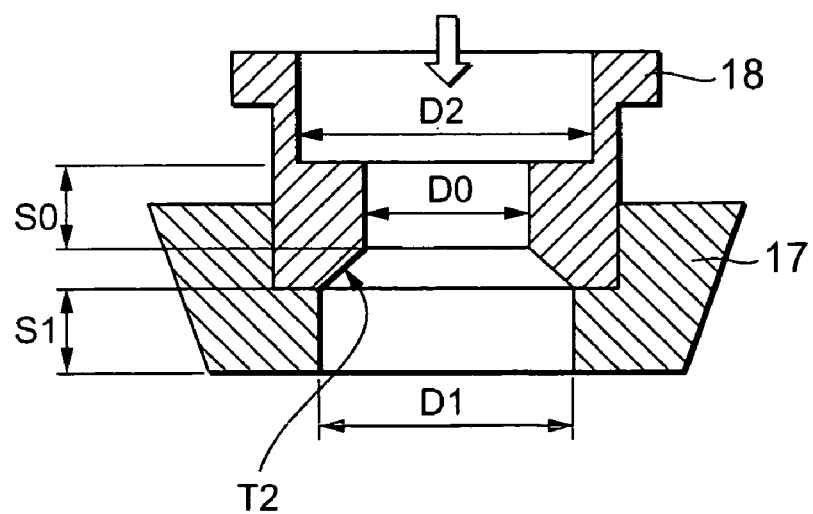

Further, as in FIG. 5(b), in the assemblage of the nozzle 17 and the coupling member 18, the machining-fluid outlet side may have a tapered form (T2 in the diagram) and may be connected to the hollow portion with the internal diameter D1 on the outlet side.

That is, with regard to the assemblage of the nozzle 17 and the coupling 18, the hollow portion defining the external diameter of the machining-fluid ejected during contact machining may have a portion with a cross-sectional area that does not change (S1 in the diagram, the portion with internal diameter D1), and the hollow portion defining the external diameter of the machining-fluid ejected during separation machining may have a portion with a cross-sectional area that does not change (S0 in the diagram, the portion with internal diameter D0).

In the configuration of FIG. 5(a), by selecting the details (tapered portion length, angle, and the like) of the tapered portion (T1 in the diagram), the size of the downward force due to the machining-fluid pressure, equivalent to F2 in equation (1), can be changed, and thus, by selecting the details, the pressing force F of the nozzle 17 on the workpiece during nozzle contact machining can be made approximately zero.

Therefore, effects similar to that of the configuration of FIG. 1 can also be achieved with the configuration of FIG. 5.

In the above explanation the machining-fluid ejection device attached to the upper machining head has been described; however, a similar configuration can be adopted for the machining-fluid ejection device attached to the lower machining head.

EMBODIMENT 2

Figure 6:
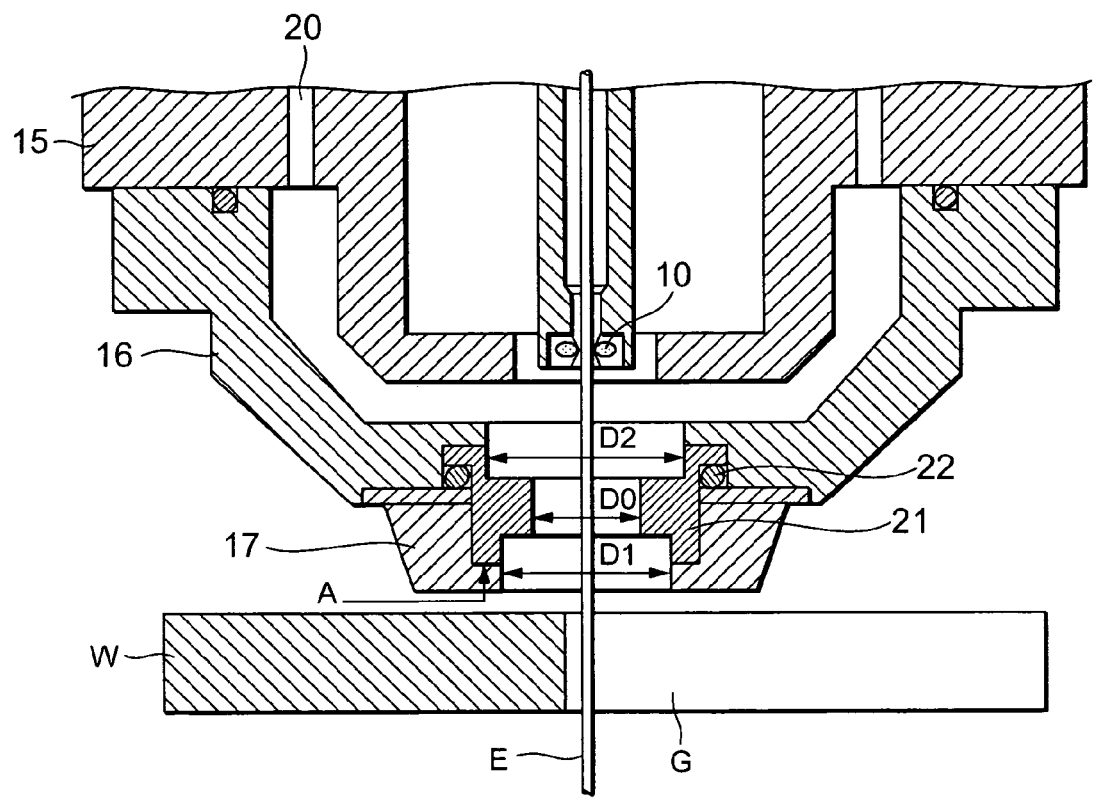
FIG. 6 is a sectional diagram illustrating a configuration of the machining-fluid ejection device for the wire electric discharge machining apparatus related to Embodiment 2 of the present invention.

FIG. 6 is a sectional diagram illustrating a configuration of the machining-fluid ejection device for the wire electric discharge machining apparatus related to Embodiment 2 of the present invention. In the figure, reference numeral 21 is a coupling member, reference numeral 22 is an elastic body, such as, for example, an O-ring, having a predetermined elastic coefficient. In FIG. 6, references identical to those of FIG. 1 in Embodiment 1 illustrate the same or equivalent parts.

The nozzle 17 is fixed to an extremity (A in the diagram) on the machining-fluid outlet side of the coupling member 21, and the coupling member 21 is supported so that it can slide in the machining-fluid ejection direction relative to the casing 16. Since the elastic body 22, disposed between the casing 16 and the coupling member 21, deforms depending on the machining-fluid pressure, a righting force due to this deformation acts on the coupling member 21 in a direction opposite to the machining-fluid ejection direction.

Therefore, with regard to the condition (equivalent to FIG. 2(*a*) of Embodiment 1) in which the nozzle 17 touches the casing 16, as in FIG. 6, when the machining-fluid pressure becomes high, due to the deformation of the elastic body 22, the nozzle 17 moves in a direction to make contact with the workpiece W (equivalent, for example, to FIG. 2(*b*) of Embodiment 1).

When the machining-fluid pressure is low, the elastic body 22 deformation retracts, and the nozzle 17 returns to the position of FIG. 6.

In the configuration of FIG. 6 related to Embodiment 2 of the present invention, since the nozzle 17 moves due to the deformation of the elastic body 22, the coupling member 21 may be made of material with sufficiently high rigidity.

With the above type of configuration, by selecting the minimum internal diameter D0 of the coupling member 21, the internal diameter D1 of the machining-fluid outlet side, and the internal diameter D2 of the machining-fluid inlet side, similarly to Embodiment 1, effects similar to Embodiment 1 are achieved.

Figure 7:
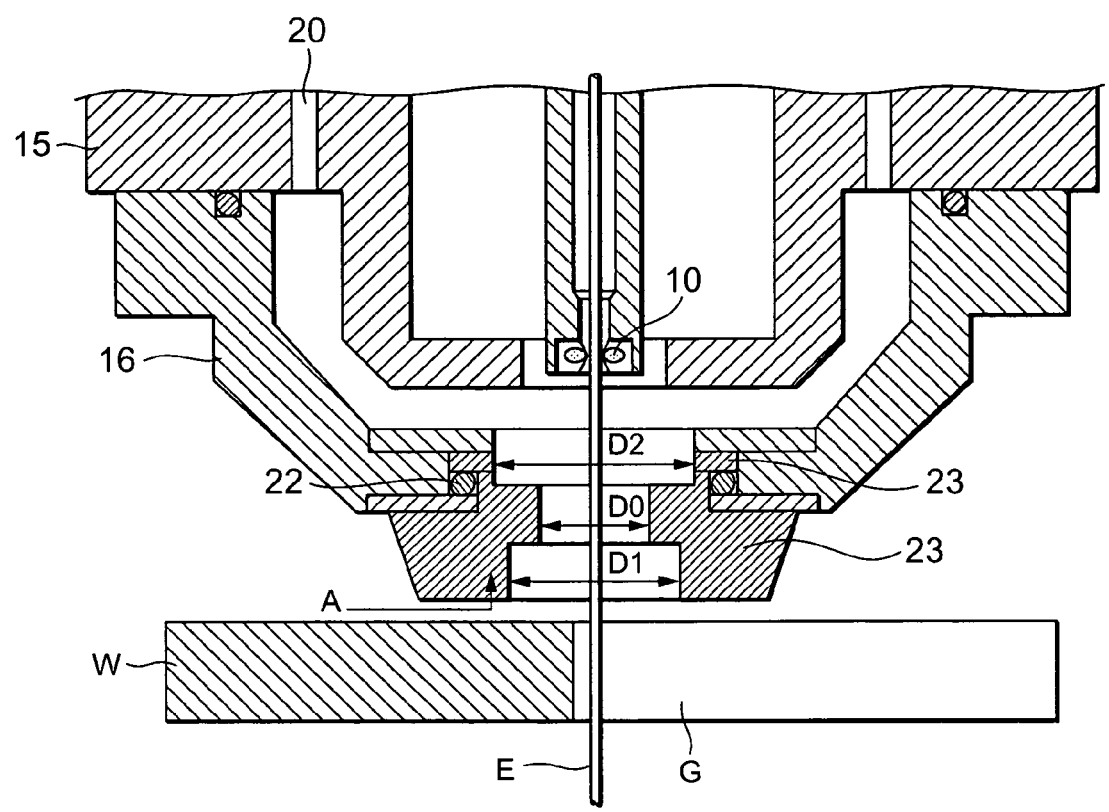
FIG. 7 is a sectional diagram illustrating an alternative configuration of the machining-fluid ejection device for the wire electric discharge machining apparatus related to Embodiment 2 of the present invention.

FIG. 7 is a sectional diagram illustrating an alternative configuration of the machining-fluid ejection device for the wire electric discharge machining apparatus related to Embodiment 2 of the present invention. In the figure, reference numeral 23 is a nozzle, reference D1 is the machining-fluid outlet side internal diameter of the nozzle 23, reference D2 is the machining-fluid inlet side internal diameter of the nozzle 23, reference D0 is the minimum internal diameter of the nozzle 23. References identical to those of FIG. 6 illustrate similar or equivalent parts.

The nozzle 23 is supported so that it can slide in the machining-fluid ejection direction relative to a casing 16. An elastic body 22, disposed between the casing 16 and the nozzle 23, deforms according to the machining-fluid pressure, and thus a righting force due to the deformation acts on the nozzle 23 in a direction opposite to the machining-fluid ejection direction.

Therefore, with regard to the condition as in FIG. 7 in which the nozzle 23 touches the casing 16 (equivalent to FIG. 2(*a*) in Embodiment 1), when the machining-fluid pressure is high, due to the deformation of the elastic body 22, the nozzle 23 moves in a direction to make contact with the workpiece W (equivalent, for example, to FIG. 2(*b*) of Embodiment 1).

When the machining-fluid pressure is low, the elastic body 22 deformation retracts, and the nozzle 23 returns to a position illustrated in FIG. 7.

With the above type of configuration, by selecting, similarly to Embodiment 1, the minimum internal diameter D0 of the nozzle 23, the internal diameter D1 of the machining-fluid outlet side, and the internal diameter D2 of the machining-fluid inlet side, effects similar to Embodiment 1 are achieved.

EMBODIMENT 3

Figure 8:
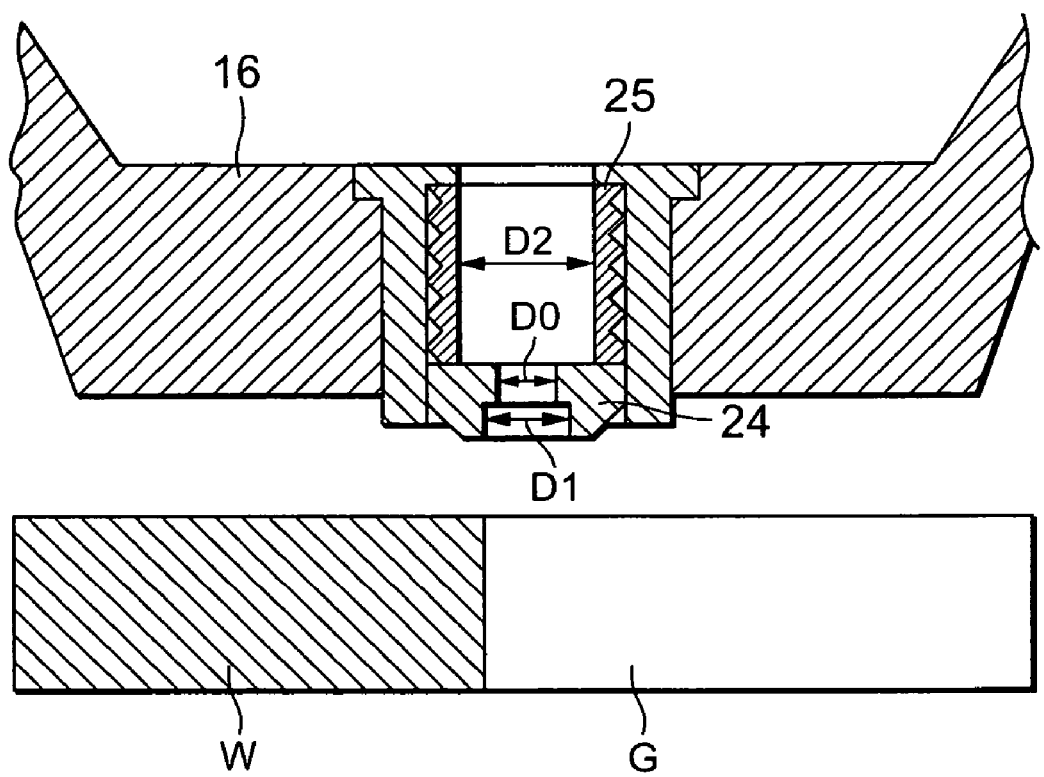
FIG. 8 is a sectional diagram illustrating a configuration of the machining-fluid ejection device for the wire electric discharge machining apparatus related to Embodiment 3 of the present invention.
Figure 9A:
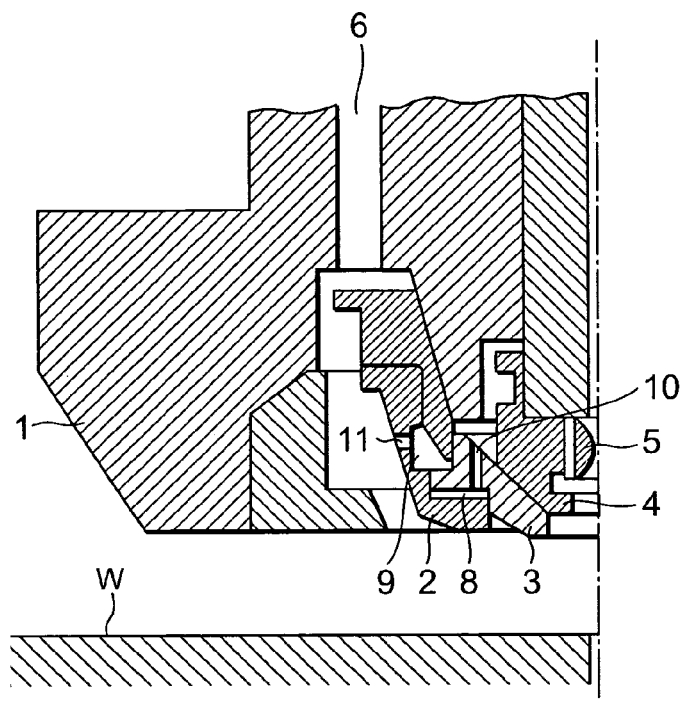
FIGS. 9a and 9b are sectional diagrams illustrating configurations of a machining-fluid ejection device for a conventional wire electric discharge machining apparatus.
Figure 9B:
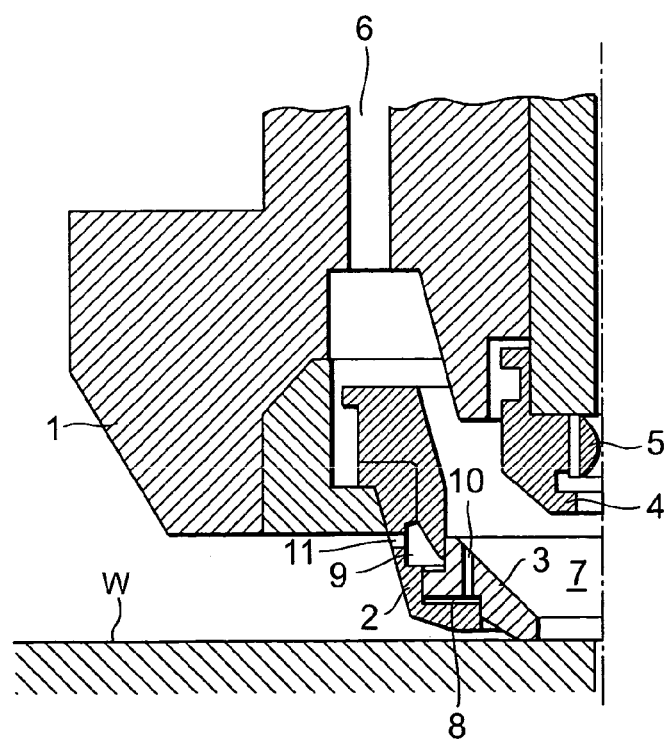
Figure 10A:
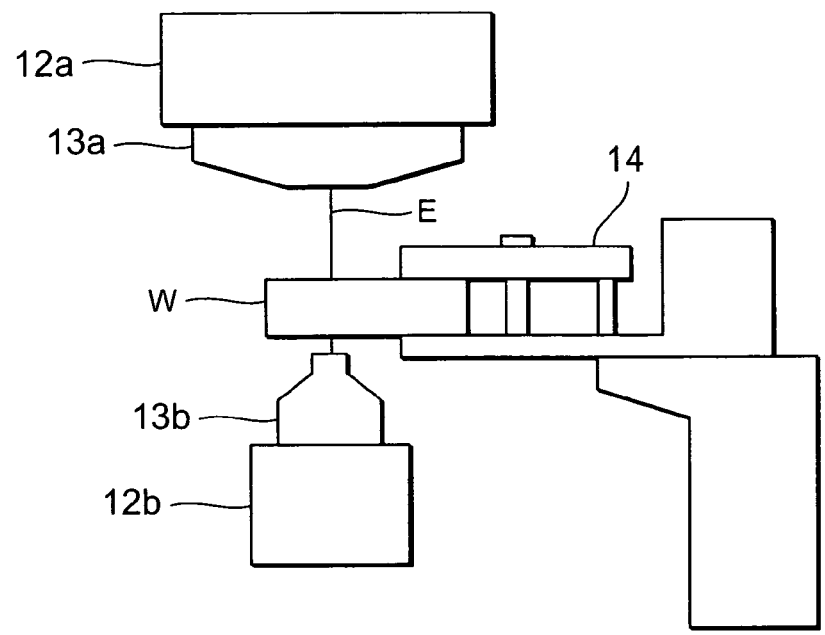
FIGS. 10a and 10b are explanatory diagrams illustrating a machining example in which a distance is required between nozzle and workpiece.
Figure 10B:
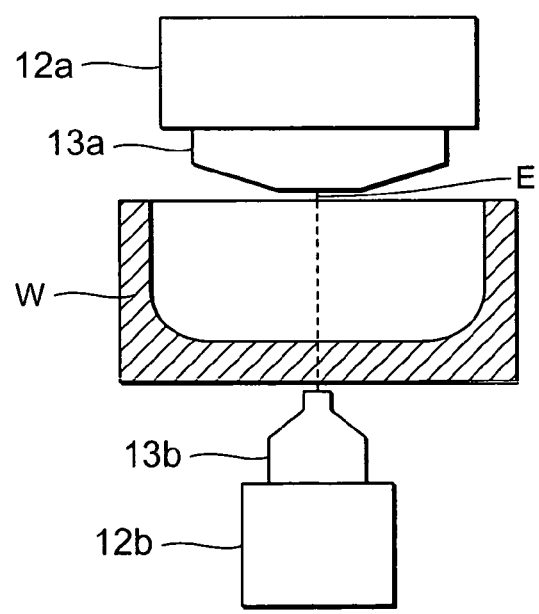

FIG. 8 is a sectional diagram illustrating a configuration of the machining-fluid ejection device for the wire electric discharge machining apparatus related to Embodiment 3 of the present invention. In the figure, reference numeral 24 is a nozzle, reference numeral 25 is a coupling member formed of a tubular elastic body such as an extensible and contractible tube, reference D1 is the internal diameter of the machining-fluid outlet side, reference D2 is the internal diameter of the coupling member 25, and reference D0 is the minimum diameter of the nozzle 24. In FIG. 8, references identical to those of FIG. 1 of Embodiment 1 illustrate similar or equivalent parts.

One end of the coupling member 25 is fixed to a casing 16 and the other end is fixed to the nozzle 24, and the nozzle 24 and the coupling member 25 form an assemblage.

In FIG. 8, the internal diameter of the coupling member is D2 (equivalent to the internal diameter D2 of the machining-fluid inlet side of the coupling member 18 of FIG. 1), the minimum internal diameter of the nozzle 24 is D0 (equivalent to the minimum diameter D0 of the coupling member 18 of FIG. 1), the internal diameter on the machining-fluid outlet side of the nozzle 24 is D1 (equivalent to the internal diameter D2 of the machining-fluid outlet side of the coupling member 18 of FIG. 1), and the orifice is composed of the coupling member 25 and the nozzle 24.

By means of this type of configuration, if the minimum internal diameter D0 and the machining-fluid outlet side internal diameter D1 of the nozzle 24 together with the internal diameter D2 of the coupling member 25 are selected in the same way as for Embodiment 1, effects similar to Embodiment 1 are achieved.

INDUSTRIAL APPLICABILITY

As described above, the machining-fluid ejection device for the wire electric discharge machining apparatus related to this invention is particularly suitable for use in wire electric discharge machining where high machining productivity is required.

The invention claimed is:

1. A machining-fluid ejection device for a wire electric discharge machining apparatus comprising:
   a nozzle, fixed to a machining head disposed above or below a workpiece, for ejecting machining-fluid into an interelectrode gap between the workpiece and a wire electrode; a casing fixed to the machining head; and a coupling member for coupling the casing and the nozzle and deforming according to the machining-fluid pressure, said coupling member having a predetermined elastic coefficient; wherein an assemblage of the coupling member and the nozzle which form a machining-fluid path has a internal diameter on a machining-fluid outlet side which is larger than a internal diameter of the upstream of the machining-fluid outlet side.

2. The machining-fluid ejection device for the wire electric discharge machining apparatus according to claim 1, wherein the assemblage of the coupling member and the nozzle has a outlet side hollow portion of a predetermined internal diameter of outlet side, whose sectional area does not change, formed on the machining-fluid outlet side, and a upstream hollow portion of a predetermined internal diameter, which is smaller than the internal diameter of the outlet side hollow portion machining-fluid outlet side.

3. The machining-fluid ejection device for the wire electric discharge machining apparatus according to claim 2, wherein the internal diameter of the outlet side hollow portion is selected to optimize the efficiency of the machining-fluid ejection into the inter-electrode gap when machining a corner portion with the nozzle and the workpiece in close proximity or in contact, and the internal diameter of the upstream hollow portion is selected to optimize the efficiency of the machining-fluid ejection into the inter-electrode gap when machining a corner portion with the nozzle and the workpiece separated.

4. The machining-fluid ejection device for the wire electric discharge machining apparatus according to claim 2, wherein the assemblage of the coupling member and the nozzle further comprising, a inlet side hollow portion of a predetermined internal diameter, which is larger than the internal diameter of the upstream hollow portion and its whose sectional area does not change, formed upstream of the upstream hollow portion.

5. The machining-fluid ejection device for the wire electric discharge machining apparatus according to claim 4, wherein the internal diameter of the inlet side hollow portion is selected so that the pressing force of they nozzle on the workpiece is approximately zero when machining with the nozzle and the workpiece in contact.

6. A machining-fluid ejection device for a wire electric discharge machining apparatus comprising:
 a nozzle, fixed to a machining head disposed above or below a workpiece, for ejecting machining-fluid into an interelectrode gap between the workpiece and a wire electrode;
 a casing fixed to the machining head; a coupling member supported so that it can slide, relative to the casing, in the direction of machining-fluid ejection, the coupling member linking the casing and the nozzle; and an elastic body, having a predetermined elastic coefficient, deforming according to the machining-fluid pressure, a righting force due to this deformation acting on the coupling member in a direction opposite to the direction of the machining-fluid ejection; wherein an assemblage of the coupling member and the nozzle which form machining-fluid path has a outlet side hollow portion of a predetermined internal diameter of outlet side, whose sectional area does not change, formed on the machining-fluid outlet side, and a upstream hollow portion of a predetermined internal diameter, which is smaller than the internal diameter of the outlet side hollow portion and its sectional area does not change, formed upstream of the machining-fluid outlet side.

7. The machining-fluid ejection device for the wire electric discharge machining apparatus according to claim 6, wherein the internal diameter of the outlet side hollow portion is selected to optimize the efficiency of the machining-fluid ejection into the inter-electrode gap when machining a corner portion with the nozzle and the workpiece in close proximity or in contact, and the internal diameter of the upstream hollow portion is selected to optimize the efficiency of the machining-fluid ejection into the inter-electrode gap when machining a corner portion with the nozzle and the workpiece separated.

8. The machining-fluid ejection device for the wire electric discharge machining apparatus according to claim 6, wherein the assemblage of the coupling member and the nozzle further comprising, a inlet side hollow portion of a predetermined internal diameter, which is larger than the internal diameter of the upstream side hollow portion and its sectional area does not change, formed upstream of the upstream hollow portion.

9. The machining-fluid ejection device for the wire electric discharge machining apparatus according to claim 8, wherein the internal diameter of the inlet side hollow portion is selected so that the pressing force of the nozzle on the workpiece is approximately zero when machining with the nozzle and the workpiece in contact.

10. A machining-fluid ejection device for a wire electric discharge machining apparatus comprising:
 a nozzle, fixed to a machining head disposed above or below a workpiece, for ejecting machining-fluid into an inter-electrode gap between the workpiece and a wire electrode;
 a casing fixed to the machining head; a nozzle supported so that it can slide, relative to the casing, in the direction of machining-fluid ejection; and an elastic body, having a predetermined elastic coefficient, deforming according to the machining-fluid pressure, a righting force due to this deformation acting on the nozzle in a direction opposite to the direction of the machining-fluid ejection; wherein the nozzle has a outlet side hollow portion of a predetermined internal diameter of outlet side, whose sectional area does not change, formed on the machining-fluid outlet side, and a upstream hollow portion of a predetermined internal diameter, which is smaller than the internal diameter of the outlet side hollow portion and its sectional area does not change, formed upstream of the machining-fluid outlet side.

11. The machining-fluid ejection device for the wire electric discharge machining apparatus according to claim 10, wherein the internal diameter of the outlet side hollow portion is selected to optimize the efficiency of the machining-fluid ejection into the inter-electrode gap when machining a corner portion with the nozzle and the workpiece in close proximity or in contact, and the internal diameter of the upstream hollow portion is selected to optimize the efficiency of the machining-fluid ejection into the inter-electrode gap when machining a corner portion with the nozzle and the workpiece separated.

12. The machining-fluid ejection device for the wire electric discharge machining apparatus according to claim 10, wherein the nozzle further comprising, a inlet side hollow portion of a predetermined internal diameter, which is larger than the internal diameter of the upstream hollow portion and its sectional area does not change, formed upstream of the upstream hollow portion.

13. The machining-fluid ejection device for the wire electric discharge machining apparatus according to claim 12, wherein the internal diameter of the inlet side hollow portion is selected so that the pressing force of the nozzle on the workpiece is approximately zero when machining with the nozzle and the workpiece in contact.

* * * * *